April 7, 1953    CHI MOU TSANG    2,633,903
SPRING SEAT STRUCTURE

Filed Jan. 8, 1951    2 SHEETS—SHEET 1

CHI MOU TSANG
INVENTOR.

BY E.C. McRae
J.R. Faulkner
J.H. Oster
ATTORNEYS

April 7, 1953 CHI MOU TSANG 2,633,903
SPRING SEAT STRUCTURE
Filed Jan. 8, 1951 2 SHEETS—SHEET 2
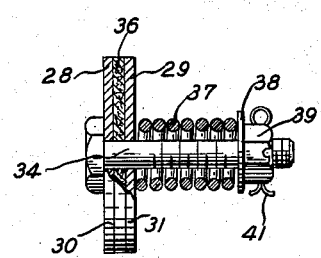
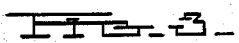
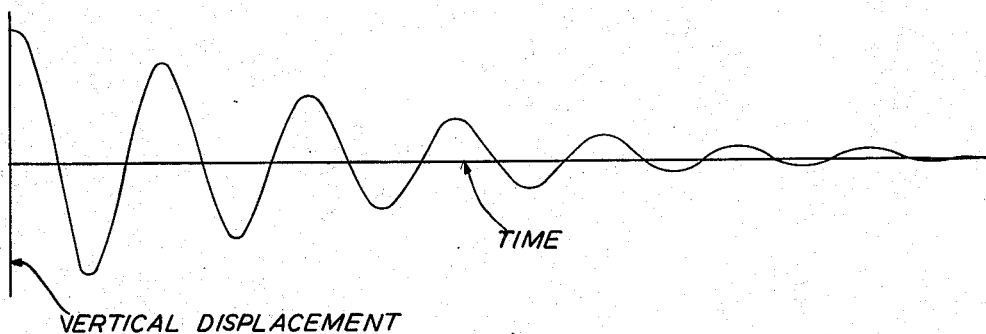
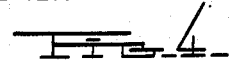
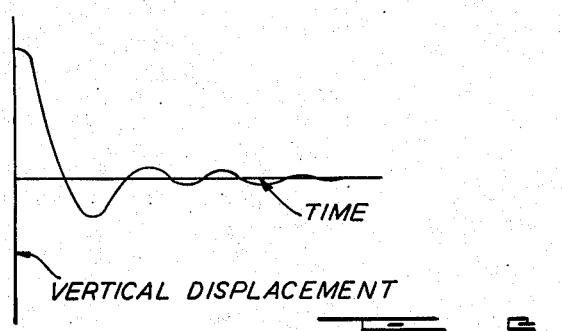
CHI MOU TSANG
INVENTOR.
BY E.C. McRae
J.R. Faulkner
J.H. Oster
ATTORNEYS Patented Apr. 7, 1953

2,633,903

UNITED STATES PATENT OFFICE 2,633,903

SPRING SEAT STRUCTURE

Chi Mou Tsang, Dearborn, Mich., assignor to Ford Motor Company, Dearborn, Mich., a corporation of Delaware Application January 8, 1951, Serial No. 204,873

9 Claims. (Cl. 155—179)

This invention relates generally to a spring seat structure for motor vehicles, and more particularly to a cushioned seat structure employing flat wire springs of sinuous or corrugated shape and incorporating means for dampening the vibration of the springs.

An object of the present invention is to provide a motor vehicle seat construction utilizing zig-zag springs and incorporating means for dampening vibrations of the springs during operation of the vehicle. By quickly diminishing the amplitude of the vibrations of the zig-zag springs and the passengers supported thereon, and returning the vibrating body rapidly to its original rest position, increased riding comfort is obtained and passenger fatigue is greatly reduced.

It is a further object of the invention to provide a seat structure incorporating zig-zag springs in combination with dampening means in which the dampening is accomplished silently and without creating hard spots in the seat cushions which might cause passenger discomfort. Yet another object of the invention is to provide a structure of this type in which the dampening means can be supported for proper operation even though the seat structure is longitudinally adjustable, as in the case of the front seats of passenger vehicles. In the present invention the above objects and others are obtained with a minimum of added expense and by utilizing components of the normal seat structure so that additional mounting means are unnecessary.

Other objects and advantages of this invention will be made more apparent as this description proceeds, particularly when considered in connection with the accompanying drawings, wherein:

Figure 3 is a cross sectional view taken on the line 3—3 of Figure 1.

Figure 4 is a chart of the vibration curve of a conventional seat.

Figure 5 is a chart of the vibration curve of a seat constructed in accordance with the present invention.

Figure 1:
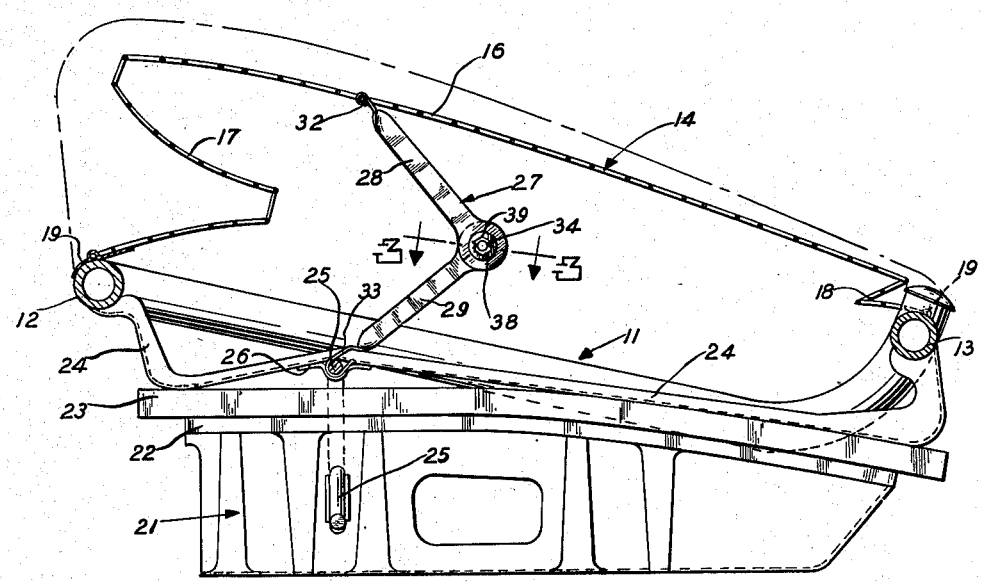
Figure 1 is a vertical cross sectional view, partly in elevation, of a spring seat structure incorporating the present invention.
Figure 2:
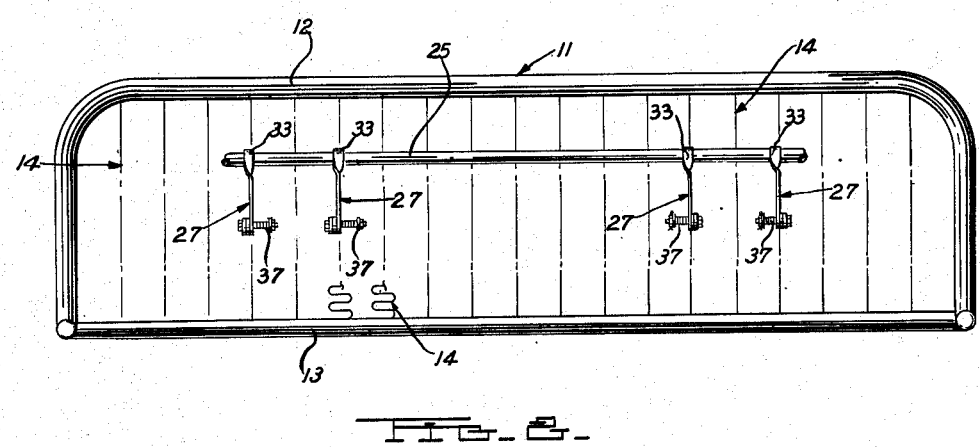
Figure 2 is a semi-diagrammatic plan view of the seat structure shown in Figure 1.

Referring now to the drawings and particularly to Figures 1 and 2, the reference character 11 indicates a front seat frame shown as formed of hollow tubing and having front and rear rails 12 and 13 respectively. A plurality of transversely spaced springs 14 extend longitudinally between the front and rear rails of the seat frame. Each spring unit 14 is made of steel wire bent to a sinuous or corrugated shape so that the adjacent loops of the spring are substantially parallel to each other and the spring can be longitudinally stretched or compressed under load. Each spring has a crowned seating portion 16 and generally V-shaped portions 17 and 18 at the front and rear in accordance with conventional practice. The opposite ends of each spring are suitably connected by means of brackets 19 to the front and rear rails of the frame.

A pair of longitudinally adjustable seat track units 21 support the front seat structure. Each seat track unit 21 comprises a lower track 22 mounted upon the vehicle floor and an upper track 23 slidably mounted upon the lower track by means of suitable anti-friction means (not shown). The front and rear rails of the seat frame 11 are supported upon the upper tracks of the seat track units by means of brackets 24 welded to the rails of the seat frame and bolted to the upper tracks 23. In the construction shown, a torsion bar 25 extends laterally of the vehicle between the upper tracks 23 of the two seat track units and serves to promote uniform longitudinal adjustment of both sides of the seat. The torsion bar 25 is mounted upon the seat frame brackets 24 by means of straps 26, and the opposite ends of the bar are return bent with the ends being received in vertical slots provided in the seat track frames 21.

For the purpose of dampening the vibrations of the springs 14 and bringing the vibrating springs and their supported load to rest as quickly as possible consistent with passenger comfort, the seat structure incorporates a number of dampening units 27. As shown in Figure 2, one possible arrangement is the utilization of four dampening units arranged in pairs on opposite sides of the seat structure with the units of each pair being laterally spaced and located substantially beneath the normal passenger position upon the seat. It has been found, as explained later in connection with Figures 4 and 5, that this arrangement provides good riding comfort and minimizes passenger fatigue, although various other combinations and arrangements are also possible.

Since the dampening units are identical, only one will be described in detail. Each dampening unit comprises a pair of stamped arms 28 and 29. The arms are flat throughout their major extent and are formed at one end with flat enlarged end portions 30 and 31 apertured to receive a pivot pin. The opposite ends of the arms are twisted and then bent to form hook-shaped end portions. As best seen in Figure 1, arm 28 is formed with a hook-shaped end portion 32 adapted to receive one loop of one of the sinuously corrugated springs 14. After being hooked over the spring loop, the hook-shaped end of the arm is closed to prevent this disengagement from the spring, yet provide pivotal movement between the arm and the spring. The hook-shaped end 33 of the arm 29 is provided with a somewhat larger opening and receives the torsion bar 25 extending between the two track units 21. During assembly the hook-shaped end 33 of the arm 29 is likewise crimped around the bar 25 to prevent disengagement yet permit pivotal movement. The bar is staked at opposite sides of the hook-shaped end 33 to prevent displacement of the arm along the bar and to hold it in the proper position relative to the springs.

The enlarged end portions 30 and 31 of the arms 28 and 29 are generally circular in shape and of identical size and are arranged in alignment with each other, being pivotally connected to each other by means of a pivot pin best shown in Figure 3 as comprising a bolt 34. Interposed between the enlarged end portions 30 and 31 of the two arms is a disk 36 of suitable friction material. This disk is of the same diameter as the circular end portions of the arms and is apertured to receive the bolt 34. A coil spring 37 encircles the extending end of the bolt and is held in place by a washer 38, and a nut 39, the latter being held against rotation by a cotter pin 41.

It will be apparent that the nut 39 can be tightened upon the bolt 34 to compress the spring 37 to any desired degree to obtain the necessary pressure between the friction disk 36 and the adjacent enlarged end portions 30 and 31 of the two arms. The arm 28 of the dampening unit is preferably connected to a loop of one of the sinuous springs 14 at an intermediate point between the front and rear rails of the seat frame near the point of maximum deflection of the seat under load.

During operation of the vehicle over rough roads the resulting vertical displacement of the passenger sets up an oscillation in the sinuous springs 14 which, if undampened, continues for a number of cycles in a gradually decreasing amplitude, as shown in the chart illustrated in Figure 4. It will be seen from this view that the time required to completely dampen the oscillations and to bring the spring and load to its position of rest is relatively long.

In Figure 5 there is shown a chart of the same seat structure provided with the dampening means shown in the drawings and it will be apparent that the vibrations are quickly dampened and brought to rest in a considerably shorter time. Improved riding comfort is provided and passenger fatigue is also reduced. In addition, the reduction in the amplitude of the vibrations and the number of vibrations is effective in reducing the rubbing between the passenger's coat and the adjacent upholstery of the seat back.

Various types of material can be utilized for the friction disk 36, as for example wax impregnated paper or fabric. It is desirable to select a material having a low static co-efficient of friction to eliminate an unpleasant break away feeling at the beginning of the relative movement between the two arms of the dampening unit. The degree of dampening desired can of course be varied by the selection of material having different co-efficients of dynamic friction, by the adjustment of the spring compression, and by the arrangement of the arms and their mountings. The adjusting nuts 39 also permit suitable adjustment to provide the desired operation should the passenger's weight vary considerably from the normal passenger weight for which the device was originally adjusted.

It will be noted that the device is relatively easy to install and does not require additional mounting brackets or the like. The utilization of the torsion bar connecting the two seat track units as a mounting support for one of the arms of each dampening unit is advantageous since the bar is longitudinally moveable with the seat structure during adjustment and consequently the same relationship between the two arms of the dampening devices is retained regardless of the longitudinal position of the seat. In the event the device is used with seats other than those having a connecting member of this type, a suitable support can be provided such as a bar extending from one end to the other of the seat frame. This, however, adds to the cost.

Certain of the springs of the seat structure are often doubled, that is, provided with short helper springs secured thereto. In the event it is desired to fasten one of the dampening units to a spring of this type, the hook-shaped end can be clamped through the loop of the full length spring without interfering with the helper spring. It has been found in some cases that the dampening device permits the elimination of the helper spring entirely thus reducing cost.

While the drawing shows the utilization of two dampening units at each side of the seat frame, many other combinations are possible. For example, a single dampening unit can be utilized under each passenger position, and additional dampening units can be installed wherever desired. It has been found, however, that adding an excessive number of dampening units increases the cost without greatly increasing the benefit secured therefrom. In addition, the dampening devices can be applied to rear vehicle seats as well as to front seats.

It will be understood that the invention is not to be limited to the exact construction shown and described, but that various changes and modifications may be made without departing from the spirit and scope of the invention, as defined in the appended claims.

What is claimed is:

1. A cushioned seat structure for a motor vehicle comprising a pair of laterally spaced longitudinally extending seat track units each including a first element mounted upon said vehicle and a second element longitudinally adjustable upon said first element, a member interconnecting said second track elements, a seat frame carried by said second track element and longitudinally adjustable therewith, a plurality of sinuously corrugated wire springs laterally spaced from each other and extending between the front and rear rails of said seat frame, an arm pivotally connected to said member, a second arm pivotally connected to one of the loops of one of said sinuously corrugated springs at an intermediate location between the front and rear rails of the frame, means pivotally connecting said first and second arms together, and friction means interposed between said first and second arms adjacent said last mentioned pivotal connection to dampen relative angular movement between said first and second arms caused by vertical displacement of said one sinuously corrugated spring.

2. The structure defined by claim 1 which is further characterized in that the ends of said first and second arms remote from the pivotal connections of said arms to said member and said spring loop respectively comprised flat enlarged portions arranged in juxtaposition to each other with the friction means interposed between said enlarged portions so as to have frictional engagement with each of said portions, the pivotal means connecting said arms extending through said enlarged portions and through the interposed friction means, and resilient means carried by said pivotal means and yieldingly urging the enlarged portions of said arms into frictional engagement with said friction means.

3. The structure defined by claim 1 which is further characterized in that each of said arms comprises a flat stamping having an enlarged head at one end thereof and a hook-shaped portion at the other end thereof twisted at right angles to the main body portion of the stamping, the hook-shaped end of one of said arms being pivotally connected to the member interconnecting the seat track units and the hook-shaped end of the other of said arms being pivotally connected to one of the loops of one of the sinuously corrugated springs, the enlarged heads of said arms being arranged in juxtaposition with the friction means interposed therebetween, and the means pivotally connecting said arms comprising a shouldered pin extending through the enlarged head of said arms and the interposed friction means, a coil spring encircling said pin on the side of the arms remote from the shouldered portion of the pin, and spring retaining means at the end of said pin maintaining said spring under compression to hold said enlarged head of the arms in frictional engagement with said friction means.

4. A cushioned seat structure for a motor vehicle comprising a pair of laterally spaced lower seat track members mounted upon said vehicle, a pair of upper seat track members mounted upon said lower seat track members for longitudinal sliding movement thereon, a seat frame carried by said upper seat track members for longitudinal movement therewith, a torsion bar extending between and supported upon said upper seat track members and having offset end portions connected to said lower seat track members for the purpose of assisting and securing substantially uniform longitudinal adjustment of opposite sides of said seat frame, a plurality of continuously corrugated wire springs bent into sinuous shape and extending between the front and rear rails of the seat frame in laterally spaced relationship to each other, each of said springs having a crowned central portion adapted to support the weight of passengers seated upon the seat structure, dampening units located at opposite sides of the seat structure substantially in vertical alignment with normal passenger positions and each comprising an arm having one end pivotally connected to one of the loops of the crowned seating portion of one of the corrugated wire springs, a second arm having one end pivotally connected to the bar extending between and supported upon the longitudinally movable upper seat track members, the other ends of said first and second arms having flat enlarged portions lying in planes extending substantially at right angles to the plane of the seating portion of the seat structure and positioned adjacent each other, friction means located between the adjacent flat enlarged portions of said arms, and means pivotally connecting said flat enlarged portions together so that vertical displacement of the seating portion of the wire springs results in relative angular movement between the first and second arms of the dampening unit with this angular movement being resisted by the frictional engagement between the friction means and the flat enlarged ends of the arms.

5. The structure defined by claim 4 which is further characterized in that four of said dampening units are utilized with the units being arranged in pairs, each pair being located beneath a normal passenger position on the seat structure and with each of the units in each pair being laterally spaced from each other and connected to alternate continuously corrugated wire springs.

6. A cushioned seat structure for a motor vehicle comprising a seat frame mounted upon said vehicle, a plurality of laterally spaced continuously corrugated wire springs each bent into sinuous shape and extending between the front and rear rails of the seat frame, a support carried by said seat frame, an arm having one end pivotally connected to said support, a second arm having one end pivotally connected to one of the intermediate loops of one of the sinuously corrugated wire springs, the ends of said first and second arms remote from their pivotal connections being arranged adjacent to each other and pivotally connected to each other, friction means interposed between the last mentioned adjacent ends of said arms so that vertical movement of the corrugated springs of the seat structure results in angular movement between the two arms and frictional engagement between said arms and said friction means.

7. A cushioned seat structure for a motor vehicle comprising a seat frame mounted upon said vehicle, a plurality of spring units supported upon said seat frame, an arm mounted in an inclined position between the front and rear portions of said seat frame and having its upper end pivotally connected to one of said spring units, a second arm mounted in an inclined position generally beneath said first arm and having its lower end pivotally connected to a portion of said seat frame, the ends of said first and second arms remote from their pivotal connections being arranged adjacent to each other and pivotally connected to each other, friction means interposed between the last mentioned adjacent ends of said arms so that vertical movement of the spring units to which said first arm is connected results in relative angular movement between the two arms and frictional movement between said arms and said friction means.

8. A cushioned seat structure for a motor vehicle comprising a seat frame having longitudinally spaced interconnected parallel front and rear rails, a member supported upon said seat frame and extending generally parallel to said front and rear rails intermediate said rails, a plurality of spring units supported upon said seat frame, a first arm having its upper end pivotally connected to the upper portion of one of said spring units and extending downwardly therefrom at an acute angle to the vertical, a second arm having its lower end pivotally connected to said member generally vertically beneath the pivotal connection of said first arm to said spring unit and extending upwardly therefrom at an acute angle to the vertical, the ends of said first and second arms remote from their pivotal connections to said spring unit and to said member respectively having flat enlarged portions arranged in juxtaposition to each other, means pivotally connecting the flat enlarged portions of said first and second arms together for relative pivotal movement about an axis extending generally parallel to the front and rear rails of said seat frame, and friction means interposed between the flat enlarged portions of said first and second arms to dampen relative angular movement between said first and second arms resulting from vertical displacement of said one spring unit.

9. A cushioned seat structure for a motor vehicle comprising a seat frame supported upon said vehicle, a laterally extending supporting member mounted upon said seat frame and positioned between the front and rear rails thereof, a plurality of continuously corrugated wire springs bent into sinuous shape and extending between the front and rear rails of the seat frame in laterally spaced relationship to each other, each of said springs having a crowned central portion adapted to support the weight of passengers seated upon the seat structure, dampening units located at opposite sides of the seat structure substantially in vertical alignment with normal passenger positions and each comprising an inclined first arm having its upper end pivotally connected to one of the loops of the crowned seating portions of one of the corrugated wire springs, a second inclined arm having its lower end pivotally connected to the supporting member carried by the seat frame between the front and rear rails thereof, the ends of said first and second arms remote from their pivotal connections to said wire spring and said supporting member respectively having flat enlarged end portions arranged in juxtaposition to each other, a friction disk located between the adjacent flat enlarged end portions of said arms, and means pivotally connecting said flat enlarged end portions together so that vertical displacement of the seating portions of the wire springs relative to the seat frame results in relative angular movement between said first and second arms of the dampening unit with this angular movement being resisted by the frictional engagement between the friction disk and the adjacent flat enlarged end portions of the arms.

CHI MOU TSANG.

REFERENCES CITED

The following references are of record in the file of this patent:

UNITED STATES PATENTS

| Number | Name | Date |
|---|---|---|
| 2,049,550 | Van Dresser et al. | Aug. 4, 1936 |
| 2,207,054 | Freund | July 9, 1940 |
| 2,280,912 | Hopkes | Apr. 28, 1942 |
| 2,357,825 | Hickman et al. | Sept. 12, 1944 |